(12) United States Patent
Sriram et al.

(10) Patent No.: US 11,708,485 B2
(45) Date of Patent: Jul. 25, 2023

(54) HIGH MOLECULAR WEIGHT POLYMER WITH LOW INSOLUBLE GEL CONTENT

(71) Applicant: Ecolab USA Inc., St. Paul, MN (US)

(72) Inventors: Suresh R. Sriram, Aurora, IL (US); Ramasubramanyam Nagarajan, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 417 days.

(21) Appl. No.: 16/984,867

(22) Filed: Aug. 4, 2020

(65) Prior Publication Data

US 2021/0040306 A1 Feb. 11, 2021

Related U.S. Application Data

(60) Provisional application No. 62/883,777, filed on Aug. 7, 2019.

(51) Int. Cl.
| | | |
|---|---|---|
| C08L 33/26 | (2006.01) | |
| C09K 8/588 | (2006.01) | |
| C08F 20/34 | (2006.01) | |
| C08L 67/06 | (2006.01) | |
| C08J 3/05 | (2006.01) | |

(52) U.S. Cl.
CPC .............. *C08L 33/26* (2013.01); *C08F 20/34* (2013.01); *C08L 67/06* (2013.01); *C09K 8/588* (2013.01); *C08J 3/05* (2013.01); *C08L 2201/54* (2013.01)

(58) Field of Classification Search
None
See application file for complete search history.

(56) References Cited

U.S. PATENT DOCUMENTS

| | | | |
|---|---|---|---|
| 3,624,019 A * | 11/1971 | Anderson | C02F 1/5227 507/119 |
| 4,252,706 A | 2/1981 | Phillips et al. | |
| 4,687,807 A | 8/1987 | Wetegrove et al. | |
| 5,124,376 A | 6/1992 | Clark, Jr. | |
| 6,346,239 B1 | 2/2002 | Mallo et al. | |
| 8,276,664 B2 * | 10/2012 | Gupta | C09K 8/5758 166/278 |
| 11,359,135 B2 * | 6/2022 | Sriram | C09K 8/36 |
| 2005/0261399 A1 | 11/2005 | Hunkeler | |
| 2011/0054042 A1 * | 3/2011 | Wu | A23L 29/27 507/225 |
| 2011/0223125 A1 * | 9/2011 | Hough | C11D 3/3765 507/224 |
| 2011/0256085 A1 * | 10/2011 | Talingting Pabalan | C08L 5/00 424/70.16 |
| 2012/0088698 A1 | 4/2012 | Kayser et al. | |
| 2016/0333252 A1 | 11/2016 | Brinkman et al. | |

FOREIGN PATENT DOCUMENTS

| | | |
|---|---|---|
| CN | 103242471 A | 8/2013 |
| CN | 105418840 A | 3/2016 |
| CN | 106279522 A | 1/2017 |
| CN | 106749890 A | 5/2017 |
| DE | 2533108 A1 | 2/1977 |
| FR | 2277106 A1 | 1/1976 |

OTHER PUBLICATIONS

M. Renteria et al., Acrylamide inverse microemulsion polymerization in a paraffinic solvent: Rolling-M-245, Journal of Polymer Science Part A: Polymer Chemistry, 43(12), pp. 2495-2503, Jun. 2005.

James N. Greenshields, Surfactants in inverse (water-in-oil) emulsion polymers of acrylamide, Surface Active Behaviour of Performance Surfactants. 2000; 3, pp. 66-96.

Thakur et al., Inverse emulsion polymerization of acrylamide, Journal of Polymer Materials, vol. 23, No. 1, pp. 39-46, Jan./Mar. 2006.

J.S. Dong et al., Retention and drainage characteristics with inverse emulsion type C-PAM, Palpu Chongi Gisul/Journal of Korea Technical Association of the Pulp and Paper Industry, vol. 38, No. 5, pp. 24-30, 2006.

Ignác Capek, On inverse miniemulsion polymerization of conventional water-soluble monomers, Advances in Colloid and Interface Science, vol. 156, No. 1-2, pp. 35-61, Apr. 2010.

C. He et al., Structure control and influencing factors of polyimide microspheres prepared by inverse emulsion technique, Polymeric Materials Science and Engineering, vol. 32, No. 7, pp. 12-16, Jul. 2016 (Official Copy with English Abstract).

\* cited by examiner

*Primary Examiner* — John J Figueroa
(74) *Attorney, Agent, or Firm* — Kagan Binder, PLLC

(57) ABSTRACT

Described herein are treated polymers comprising a polyacrylamide homopolymer or a copolymer thereof having at least 30 mol % acrylamide residue content and a weight average molecular weight in the range of $1 \times 10^5$ g/mol to $1 \times 10^8$ g/mol, and 0.1 wt % to 10 wt % of a C1-C6 alkyl ricinoleate based on the weight of the mixture of polymer and alkyl ricinoleate. The polymers are in powder form and include less than about 30 wt % water based on the powder weight. The treated polymer powders dissolve rapidly in water and develop very little or even no insoluble gel upon diluting with water, even when the water is produced water or connate. The treated polymer solutions are useful for in-the-field rapid dilution for applications such as papermaking, flocculation, beneficiation, wastewater treatment, and enhanced oil recovery.

12 Claims, 3 Drawing Sheets

HIGH MOLECULAR WEIGHT POLYMER WITH LOW INSOLUBLE GEL CONTENT

BACKGROUND

Enhanced oil recovery, or EOR, is a generic term encompassing techniques for increasing the amount of crude oil that can be extracted from a subterranean formation such as an oil field. EOR techniques offer prospects for ultimately producing 30 to 60 percent, or more, of the reservoir's original oil in place. Three major categories of EOR, thermal recovery, gas injection, and chemical injection have been found to be commercially successful to varying degrees.

Chemical injection is the injection of polymer dispersions to increase the effectiveness of waterfloods, or the use of detergent-like surfactants to help lower the surface tension that often prevents oil droplets from moving through a reservoir. Chemical injection of a polymer is also referred to as polymer flooding. This method improves the vertical and areal sweep efficiency as a consequence of improving the water/oil mobility ratio. In addition, the polymer reduces the contrasts in permeability by preferentially plugging the high permeability zones flooded. This forces the water to flood the lower permeability zones and increases the sweep efficiency. The art in this area is well-developed for conventional oil recovery applications.

Organic polymers conventionally used in chemical injection include water soluble or dispersible polymers and copolymers of water soluble monomers such as acrylamide, acrylic acid, and the like. Generally, the molecular weight of such polymers is as high as possible in order to increase the efficiency of viscosification required to accomplish mobility in EOR applications. To achieve the highest efficiency, it is desirable to produce a polymer with the highest possible molecular weight which can then be incorporated at low weight percentages in water to achieve the desired viscosity. One of the advantages of using acrylamide/acrylic acid copolymers for EOR applications is the ease with which very high molecular weights can be reached. Conventional polymerization techniques for polyacrylamide and acrylic acid copolymers thereof are associated with weight average molecular weights of $1 \times 10^6$ to $2 \times 10^7$ g/mol or even higher. High molecular weight combined with water dispersibility have led to broad industrial applicability of these polymers as flocculants and additives in applications such as papermaking, water purification, processing of metal-containing ores, waterborne coating formulations, and many others in addition to EOR applications.

Polymer flooding is initiated by dispersing or dissolving the high molecular weight polymer in water at a concentration targeting less than 1 wt %, and often about 0.1 wt % or even lower, to achieve suitable viscosity; then injecting the dilute polymer mixture into a petroleum-bearing subterranean reservoir. Many other applications also employ these polymers at similar concentration ranges. However, transportation (shipping, distribution, and delivery in the field) of the polymers at these target concentrations is not economically efficient. The polymers may be dried and converted to a polymer powder, which is a solid, free-flowing particulate form generally including about 30 wt % or less water and a range of particle sizes of about 10 nm to 100 μm depending on the method of processing employed. Polymer powders are economically efficient for the supplier and distributor to produce and transport. However, the polymer powders are slow to hydrate and disperse in the field due to the very high molecular weight required as described above.

Exacerbating the slow rate of dissolution inherent to ultra-high molecular weight polymers is chain entanglement and chain transfer events during or after polymerization, which cause crosslinking and branching to result in a fraction of insoluble polymer content. Insoluble polymers are those that cannot disperse sufficiently in water to be filtered through a 100 mesh screen at 0.25 wt % or at 1 wt % of the polymer in water, depending on the test employed and molecular weight of the polymer tested. The presence of insoluble gels reduces the yield of usable polymer, affects performance attributes of the resulting polymer solutions, and can even cause problems in the field with equipment use and management.

A conventional method to reduce insoluble gel content of these polymers is to add a chain transfer agent (CTA) during polymerization to limit the overall molecular weight. However, this technique also lowers the overall average molecular weight, leaving manufacturers with the substantial need for polyacrylamide and copolymers thereof having a reduced content of insoluble gel, while maintaining a high average molecular weight and facilitating rapid dissolution from powder to dilute solution. There is also a substantial need for a simple method of making such materials.

SUMMARY

Described herein are treated polymers comprising, consisting essentially of, or consisting of a C1-C6 alkyl ricinoleate and a polymer, wherein the polymer comprises, consists essentially of, or consists of a polyacrylamide homopolymer or a copolymer thereof having at least 30 mol % acrylamide residue content. In embodiments a treated polymer comprises about 0.1 wt % to 10 wt %, or about 1 wt % to 5 wt % C1-C6 alkyl ricinoleate based on the weight of the treated polymer. In embodiments the treated polymer is a treated polymer powder. In embodiments a treated polymer powder comprises about 0.1 wt % to 10 wt %, or about 1 wt % to 5 wt % C1-C6 alkyl ricinoleate based on the weight of the treated polymer powder. The polymer comprises at least a portion thereof having a molecular weight in the range of $1 \times 10^6$ g/mol to $2 \times 10^7$ g/mol. In some embodiments the polymer has a weight average molecular weight in the range of $1 \times 10^6$ g/mol to $2 \times 10^7$ g/mol.

In embodiments, the polymer is a copolymer of acrylamide comprising about 99.9 wt % to about 30 wt % acrylamide residues and further comprising one or more residues of acrylic acid or a conjugate base thereof; maleic acid or a conjugate base thereof; 2-acrylamido-2-methylpropane sulfonic acid or a conjugate base thereof; 2-methyl-2-[(1-oxo-2-propenyl)amino]-1-propanesulfonic acid or a conjugate base thereof; 2-(acryloyloxy)-N,N,N-trimethylethanammonium chloride; diallyl dimethylammonium chloride; or two or more of these. In embodiments, the copolymer is a water dispersible copolymer.

In embodiments, the C1-C6 alkyl ricinoleate is methyl ricinoleate, ethyl ricinoleate, or butyl ricinoleate.

In embodiments a treated polymer powder comprises, consists essentially of, or consists of a polymer powder and about 0.1 wt % to 10 wt %, or about 1 wt % to 5 wt % C1-C6 alkyl ricinoleate based on the weight of the treated polymer powder, wherein the polymer powder comprises a particulate or granular form having a mean particle size of about 0.5 μm to 10 μm or about 0.5 μm to 5 μm when measured by light scattering, and 30 wt % water or less, such as about 1 wt % to 15 wt % water based on the weight of the polymer powder.

The treated polymer powder is characterized by faster dissolution than the corresponding untreated polymer powder, and by less insoluble gel content than the corresponding untreated polymer when dissolved or dispersed. In some embodiments a treated polymer solution comprises, consists essentially of, or consists of about 0.01 wt % to 2 wt % of the treated polymer and a water source. In some such embodiments the treated polymer solution comprises about 90 wt % to 99.99 wt % of the water source. In embodiments, a treated polymer solution is characterized as having no observable insoluble gel content. In embodiments, a treated polymer solution is characterized as having insoluble gel content that is lower than the insoluble gel content of the corresponding untreated polymer solution.

Also described herein are methods of making treated polymer powder, the method comprising, consisting essentially of, or consisting of admixing a polymer powder with a C1-C6 alkyl ricinoleate an amount corresponding to 0.1 wt % to 10 wt %, or about 1 wt % to 5 wt % based on the weight of the admixture.

Also described herein is a method of recovering hydrocarbon compounds from a subterranean reservoir, the method comprising a) contacting a water source with a treated polymer powder; b) mixing the water source and the treated polymer powder; and c) allowing the polymer to hydrate for a period of about 1 minute to 60 minutes at 20° C.-100° C. to form a treated polymer solution; c) injecting the treated polymer solution into the subterranean reservoir; and d) recovering hydrocarbon compounds from the reservoir.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Figure 1B:
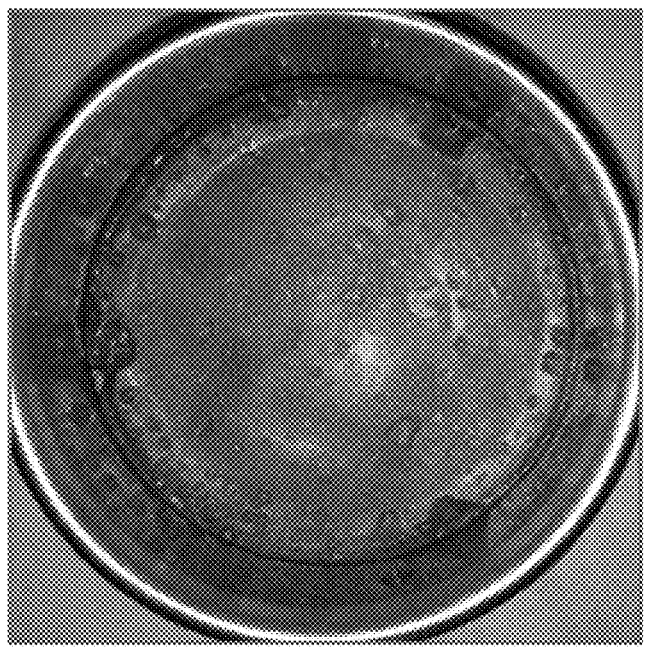
FIGS. 1A-1D are photographs of the top of a 100 mesh screen showing the visual basis for assignment of gel numbers of 0, 10, 30, and 60 respectively, as used herein.

The present disclosure relates to dissolution or dispersion of water soluble or water dispersible polymers, and compositions that provide for rapid dissolution or dispersion of polymers from solid form. Although the present disclosure provides references to preferred embodiments, persons skilled in the art will recognize that changes may be made in form and detail without departing from the spirit and scope of the invention. Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

Definitions

As used herein, the term "polymer" means a water soluble or water dispersible polymer comprising 30 wt % to 100 wt % acrylamide repeat units or residues. The polymer comprises at least a portion thereof having a molecular weight of $1\times10^6$ g/mol to $2\times10^7$ g/mol, wherein a "portion" means in this context at least one polymer chain. In some embodiments the polymer has a weight average molecular weight in the range of $1\times10^6$ g/mol to $2\times10^7$ g/mol.

As used herein, the term "monomer" means an ethylenically unsaturated polymerizable compound, or a polymerized residue thereof as taken in context. A polymer may be referred to as including one or more monomers; in such contexts the reference is directed to the polymerized residues of the one or more monomers. As used herein, the term "anionic monomer" means an unsaturated compound or polymerized residue thereof, as determined by context, bearing one or more acidic groups, or a salt (conjugate base) thereof bearing one or more negative charges. As used herein, the term "cationic monomer" means an unsaturated compound or polymerized residue thereof bearing a positive charge. As used herein, the term "nonionic monomer" means an unsaturated compound or polymerized residue thereof, as determined by context, bearing no net ionic charge. Nonionic monomers include those having no anionic or cationic functionality, as well as those having both anionic and cationic functionality and zero net charge (which may also be referred to as a zwitterionic monomer), or both.

As used herein, the term "polymer powder" refers to a polymer in particulate form, wherein the mean particle size ranges from about 10 nm to 10 mm when measured by light scattering. A polymer powder includes about 30 wt % water or less based on the weight of the powder, for example about 0.01 wt % to about 30 wt % water based on the weight of the powder. In embodiments, a polymer powder is a treated polymer powder.

As used herein, the term "polymer dispersion" or "polymer solution" are used interchangeably and refer to a polymer that is substantially dispersed or dissolved in a water source. In some embodiments the polymer in a polymer solution is fully hydrated, which as used herein means the polymer solution has reached maximum viscosity as a function of time. A polymer solution or polymer dispersion comprises about 0.01 wt % to 2 wt % of a polymer, and a water source. In some such embodiments the polymer solution comprises about 90 wt % to 99.99 wt % of the water source. A polymer solution or polymer dispersion may further include one or more salts, buffers, acids, bases, surfactants, or other compounds, materials, components, or combinations thereof that are dissolved, dispersed, or emulsified in the water source. In embodiments, a polymer solution is a treated polymer solution. In embodiments, a polymer solution or polymer dispersion is present as a continuous phase or a discontinuous phase in an emulsion or latex.

As used herein, the term "hydrate" means to allow a period of standing or mixing of a polymer powder or a treated polymer powder with a water source after the contacting of the powder and the water source. At the end of the "hydration period", a polymer solution is obtained, such as a treated polymer solution. The hydration period is not particularly limited but is typically about 1 minute to 60 minutes for a polymer powder or a treated polymer powder after contacting with a water source.

As used herein, the term "treated polymer" means a mixture comprising, consisting essentially of, or consisting of a polymer and 0.1 wt % to 10 wt % of a C1-C6 alkyl ricinoleate based on the weight of the mixture. In some embodiments the treated polymer is a treated polymer powder, wherein the weight of the mixture includes the weight of water associated with the polymer powder which may be as high as e.g. 30 wt % of the polymer powder as supplied. In some embodiments the treated polymer is a treated polymer solution or a treated polymer dispersion, which comprises, consists essentially of, or consists of about 0.01 wt % to 2 wt % of a treated polymer or a treated polymer powder combined with a water source. The term "untreated polymer" in context is a comparative term indicating a polymer that is compositionally the same as the treated polymer, except that no C1-C6 alkyl ricinoleate is present.

As used herein, the term "water source" means a source of water comprising, consisting essentially of, or consisting of water. Water sources include fresh water, deionized water, distilled water, tap water, produced water, municipal water, waste water such as runoff water or municipal waste water, treated or partially treated waste water, well water, brackish water, "gray water", sea water, or a combination of two or more such water sources as determined by context. In some embodiments, a water source includes one or more salts, ions, buffers, acids, bases, surfactants, or other dissolved, dispersed, or emulsified compounds, materials, components, or combinations thereof.

As used herein, the term "insoluble gel" means the portion of a polymer that is insoluble in water. Insoluble gel is observed by filtering a polymer solution and visually inspecting the gel-like residue retained by the filter. Insoluble gel is empirically quantified by forming a 0.25 wt % polymer solution and filtering the solution through a 100 mesh screen under gravitational force at about 20° C.; then inspecting the screen and assigning a visual rating scale or "G value" or "gel number" of 0G-60G, wherein 60G denotes the result wherein all or nearly all of the polymer is retained by the screen; and 0G denotes no polymer visibly retained by the screen.

Figure 1A:
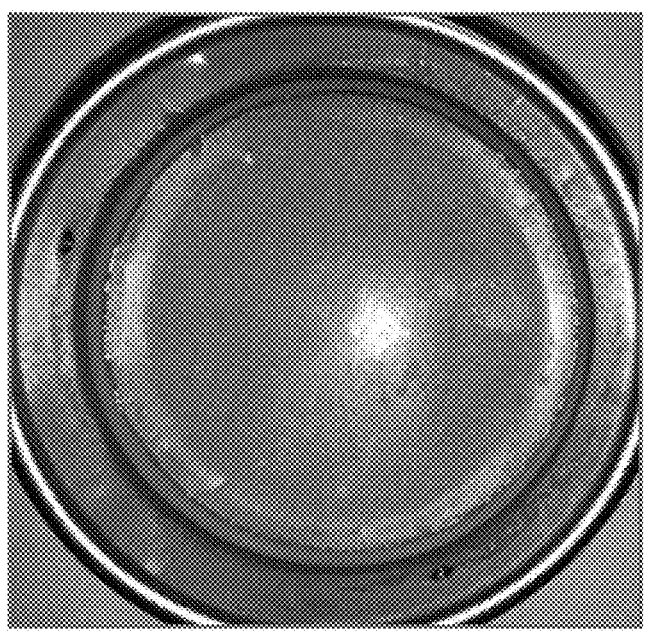
Figure 1D:
Figure 1C:

Insoluble gel content is better understood by visual comparison. Thus: FIG. 1A is a photograph of the top of a 100 mesh screen showing the visual result consistent with a gel number of 0; FIG. 1B is a photograph of the top of a 100 mesh screen showing the visual result consistent with a gel number of 10; FIG. 1C is a photograph of the top of a 100 mesh screen showing the visual result consistent with a gel number of 30; and FIG. 1D is a photograph of the top of a 100 mesh screen showing the visual result consistent with a gel number of 60.

As used herein, the term "optional" or "optionally" means that the subsequently described component, event or circumstance may be, but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Compositions

We have discovered that C1-C6 esters of 12-hydroxy-9-cis-octadecenoic acid, or ricinoleic acid (structure below), provide rapid and complete dissolution of water soluble or water dispersible polymers. Thus, a polymer powder is advantageously contacted with 0.1 wt % to 10 wt % alkyl ricinoleate based on the weight of the contacted mixture, to yield a treated polymer powder. The treated polymer powder is mixed with a water source to form a treated polymer solution having about 20,000 ppm by weight (2.00 wt %) to 100 ppm by weight (0.01 wt %) polymer. The treated polymer powder is characterized by faster dissolution than the corresponding untreated polymer powder, and upon completion of dissolution results in less insoluble gel content than the corresponding untreated polymer.

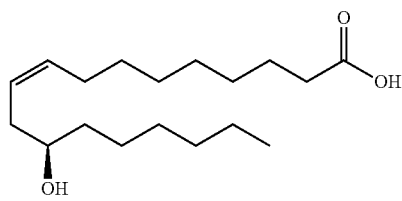

Ricinoleic acid

In embodiments, the polymer is a polyacrylamide homopolymer or a copolymer of acrylamide comprising about 99.9 wt % to about 30 wt % acrylamide residues and the residues of at least one other monomer. Polyacrylamide is a water dispersible or soluble polymer; for purposes of the present disclosure, its copolymers are also water dispersible or soluble. In embodiments the polymer comprises a residue of one or more cationic monomers, one or more anionic monomers, one or more nonionic monomers, or any combination thereof. In embodiments the polymer comprises the residues of acrylic acid or a conjugate base thereof maleic acid or a conjugate base thereof methacrylic acid or a conjugate base thereof methacrylamide; C1-C18 alkyl ester or amide derivatives of acrylic acid or acrylamide, such as N-methyl acrylamide or butyl acrylate; 2-acrylamido-2-methylpropane sulfonic acid (AMS) or a conjugate base thereof vinylphosphonic acid or a conjugate base thereof; vinyl sulfonic acid or a conjugate base thereof 2-acrylamido-2-methylpropane sulfonic acid or a conjugate base thereof; 2-methyl-2-[(1-oxo-2-propenyl)amino]-1-propanesulfonic acid or a conjugate base thereof; N-alkyl ammonium salts of 2-methyl-1-vinyl imidazole; N-alkyl ammonium salts of 2-vinyl pyridine or 4-vinyl pyridine; N-vinyl pyridine; trialkylammonium alkyl esters and amides derived from acrylic acid or acrylamide, including for example 2-(acryloyloxy)-N,N,N-trimethylethanammonium chloride; diallyl dimethylammonium chloride ("DADMAC"); N,N-dimethyl-N-dodecyl amine oxide; N,N-dimethyl-N-hexadecyl amine oxide; N,N-dimethyl-N-octadecyl amine oxide; and N,N-dimethyl-N-(Z-9-octadecenyl)-N-amine oxide. Many variations of monomer content—including the number of monomers incorporated in a polymer chain and their relative ratios—are possible without undue experimentation. In embodiments, the polymer consists essentially of or consists of acrylamide residues. In embodiments, the polymer consists essentially of or consists of residues of acrylamide and acrylic acid and/or a conjugate base thereof.

In embodiments, the polymer comprises polymerized residues of about 1 mol % to about 100 mol % acrylamide, or about 1 mol % to about 90 mol %, or about 1 mol % to about 80 mol %, or about 1 mol % to about 70 mol %, or about 1 mol % to about 60 mol %, or about 1 mol % to about 50 mol %, or about 1 mol % to about 40 mol %, or about 1 mol % to about 30 mol %, or about 1 mol % to about 20 mol %, or about 1 mol % to about 10 mol %, or about 10 mol % to about 100 mol %, or about 20 mol % to about 100 mol %, or about 30 mol % to about 100 mol %, or about 40 mol % to about 100 mol %, or about 50 mol % to about 100 mol %, or about 60 mol % to about 100 mol %, or about 70 mol % to about 100 mol %, or about 80 mol % to about 100 mol %, or about 90 mol % to about 100 mol %, or about 20 mol % to about 80 mol %, or about 30 mol % to about 70 mol %, or about 40 mol % to about 60 mol %, or about 60 mol % to about 80 mol % acrylamide residues.

The polymer comprises at least a portion thereof having a molecular weight in the range of $1\times10^5$ g/mol to $1\times10^8$ g/mol; that is, at least one polymer chain the mass of polymer selected by a user has a molecular weight of $1\times10^5$ g/mol to $1\times10^8$ g/mol. In some embodiments the polymer has a weight average molecular weight in the range of $1\times10^5$ g/mol to $1\times10^8$ g/mol, for example $3\times10^5$ g/mol to $1\times10^8$ g/mol, or $5\times10^5$ g/mol to $1\times10^8$ g/mol, or $1\times10^6$ g/mol to $1\times10^8$ g/mol, $2\times10^6$ g/mol to $1\times10^8$ g/mol, or $3\times10^6$ g/mol to $1\times10^8$ g/mol, or $4\times10^6$ g/mol to $1\times10^8$ g/mol, or $5\times10^6$ g/mol to $1\times10^8$ g/mol, or $6\times10^6$ g/mol to $1\times10^8$ g/mol, or $7\times10^6$ g/mol to $1\times10^8$ g/mol, or $8\times10^6$ g/mol to $1\times10^8$ g/mol, or $9\times10^6$ g/mol to $1\times10^8$ g/mol, or $1\times10^7$ g/mol to $1\times10^8$ g/mol, or $1\times10^6$ g/mol to $2\times10^7$ g/mol, or $1\times10^6$ g/mol to $1\times10^7$ g/mol, or $5\times10^6$ g/mol to $1\times10^7$ g/mol. In embodiments the weight average molecular weight is determined by capillary viscometry (Reduced Specific Viscosity and Intrinsic Viscosity), or multi-angle light scattering (MALS), generally in accordance with the techniques described in J. Appl. Poi. Sci. 2016, 133, 43748.

Polyacrylamide and its water dispersible copolymers are suitably synthesized employing any of the known methods of polymerization known to those of skill to form polymer chains having a molecular weight of $1\times10^5$ g/mol to $1\times10^8$ g/mol. Commercially, homolytic or redox type initiation of acrylamide (and comonomers, if any) in water solution is a simple and effective way to obtain "wet gels" comprising 10 wt % to 70 wt % polymer, for example 20 wt % to 50 wt % polymer, or 20 wt % to 50 wt % polymer.

The wet gel can be processed to a polymer powder by any suitable process familiar to those of skill. In some embodiments, the wet gel is processed to a powder by cutting the wet gel, drying the cut gel to form dry granules, and comminuting the dried granules to form a powder. In other embodiments, the wet gel is dried first, followed by cutting the dried gel product into dry granules, and comminuting the dry granules to form a powder. The wet gel is cut using any suitable method known to those of skill, such as using a Retsch Mill Cutter, to form wet gel granules. In certain embodiments, the wet gel is cut with the aid of a lubricant. The lubricant can be any suitable lubricant (e.g., a petroleum oil based lubricant). Other variations are known and often include more than one drying or comminution step. In embodiments, a C1-C6 alkyl ricinoleate is added to the wet gel or the polymer powder, either before or after drying, before or after comminution, or combinations thereof.

Drying and comminution of polyacrylamide and copolymers are also suitably carried out using any one or more processes known to those of skill; it is an advantage of the present compositions and methods that simple admixing of polyacrylamide or a copolymer thereof with a C1-C6 alkyl ricinoleate is easily achieved by addition of the ricinoleate to the wet gel or the polymer powder, or a combination of these. The rubbery, solid-feeling hydrogels that result from polyacrylamide (and copolymer) synthesis in water are conveniently comminuted in some embodiments using grinding apparatuses resembling meat grinders, then the ground gel is dried to result in a polymer powder. In such embodiments, a C1-C6 alkyl ricinoleate is added before or after grinding or drying or any combination of these.

In other embodiments, the polymer (e.g. a gel) is dried and then comminuted to form a polymer powder. In such embodiments, a C1-C6 alkyl ricinoleate is added before or after drying, comminution, or any combination of these. A polymer powder, including a treated polymer powder, includes about 30 wt % water or less based on the weight of the powder, for example about 0.01 wt % to about 30 wt %, about 0.1 wt % to about 30 wt %, about 1 wt % to about 30 wt, about 0.01 wt % to about 25 wt %, about 0.1 wt % to about 25 wt %, about 1 wt % to about 25 wt %, about 0.01 wt % to about 20 wt %, about 0.1 wt % to about 20 wt %, about 0.1 wt % to about 10 wt %, about 1 wt % to about 20 wt %, about 0.01 wt % to about 15 wt %, about 0.1 wt % to about 15 wt %, about 0.1 wt % to about 15 wt %, about 1 wt % to about 15 wt %, about 0.01 wt % to about 10 wt %, about 0.1 wt % to about 10 wt %, about 0.1 wt % to about 10 wt %, about 1 wt % to about 10 wt %, about 2 wt % to about 15 wt %, about 3 wt % to about 15 wt %, about 5 wt % to about 15 wt %, about 1 wt % to about 12 wt %, or about 3 wt % to about 12 wt %, or about 5 wt % to about 12 wt % water based on the weight of the polymer powder or treated polymer powder.

A mean or average particle size of a polymer powder or a treated polymer powder is determined using one of a number of suitable methods known in the art. Generally, for interpretation of values recited herein, the mean particle size is determined by light scattering using a Horiba Laser Scattering Particle Size Distribution Analyzer LA-950 or similar equipment. In embodiments, mean particle size is accorded the definition provided in the International Standard ISO 9276.

Thus, in various embodiments, a polymer powder or a treated polymer powder has a mean particle size of about 10 nm or more, or about 100 nm or more, or about 1 µm or more, or about 10 µm or more, or about 20 µm or more, or about 50 µm or more, or about 100 µm or more, or about 200 µm or more, or about 500 µm or more, or about 1 mm or more, or up to about 10 mm. Alternatively, or in addition, the powder can have a mean particle size of about 10 mm or less, for example, about 9 mm or less, about 8 mm or less, about 7 mm or less, about 6 mm or less, about 5 mm or less, about 4 mm or less, about 3 mm or less, about 2 mm or less, about 1 mm or less, about 800 µm or less, about 600 µm or less, about 400 µm or less, or about 200 µm or less, or about 100 µm or less, or about 50 µm or less, or about 20 µm or less, or about 10 µm or less. Thus, the powder can have a mean particle size bounded by any two of the aforementioned endpoints. The polymer powder can have a mean particle size of from about 0.01 µm to about 10,000 µm, for example, from about 0.1 µm to about 8000 µm, from about 0.1 µm to about 6000 µm, from about 1 µm to about 4000 µm, from about 1 µm to about 2000 µm, from about 10 µm to about 2000 µm, from about 20 µm to about 2000 µm, from about 50 µm to about 2000 from about 100 µm to about 2000 or from about 50 µm to about 1000 In embodiments, the polymer powder has a mean particle size of 0.1 µm to 10000 or 0.1 µm to 9000 or 1 µm to 8000 or 1 µm to 7000 or 1 µm to 6000 or 1 µm to 5000 or 1 µm to 4000 µm, or 1 µm to 3000 µm, or 1 µm to 2000 µm, or 1 µm to 1000 µm, or 1 µm to 10000 µm, or 1 µm to 9000 µm, or 1 µm to 8000 µm, or 1 µm to 7000 µm, or 1 µm to 6000 µm, or 1 µm to 5000 µm, or 1 µm to 4000 µm, or 1 µm to 3000 µm, or 1 µm to 2000 µm, or 2 µm to 5000 µm, or 2 µm to 4000 µm, or 2 µm to 3000 µm, or 2 µm to 2000 µm, or 2 µm to 1000 µm, or 10 µm to 5000 or 10 µm to 4000 or 10 µm to 3000 or 10 µm to 200 or 100 µm to 5000 or 100 µm to 4000 or 100 µm to 3000 µm, or 100 µm to 2000 µm.

Treated polymer powders are obtained by contacting a polymer powder with 0.1 wt % to 10 wt % of a C1-C6 alkyl ricinoleate based on the weight of the treated polymer powder. The alkyl ricinoleate is sourced from synthetic or natural sources, as selected by the user. For example, castor oil is a natural source of ricinoleic acid, which is useful for making the C1-C6 alkyl esters thereof using conventional esterification with a C1-C6 alkanol. Such esterification processes, as well as purification of the desired ester specie(s), are well understood by those of skill. In embodiments the alkyl ricinoleate is methyl ricinoleate, ethyl ricinoleate, n-propyl ricinoleate, i-propyl ricinoleate, n-butyl ricinoleate, or a mixture of two or more thereof. In embodiments the alkyl ricinoleate is methyl ricinoleate or n-butyl ricinoleate or a mixture thereof.

In some embodiments, the alkyl ricinoleate is used neat, that is, as 100% of the ester or substantially as the pure ester. In some embodiments the alkyl ricinoleate is used as dissolved in a water soluble solvent, such as a lower alkanol, glycol, glycol ester, or glycol ether. However, we have found that it is not necessary to use a solvent in order to distribute the alkyl ricinoleate in the polymer powder. Neat ricinoleate esters of C1-C6 alkanols are liquids at common ambient temperatures of about 20° C. Consequently, solvents are not required to disperse the alkyl ricinoleate within the polymer powder; the oily liquid is suitably mixed with a polymer powder by simple mechanical mixing of the powder with the neat alkyl ricinoleate.

In embodiments, a polymer powder is admixed with about 0.1 wt % to 10 wt % of the C1-C6 alkyl ricinoleate based on the weight of the admixture; wherein admixing is achieved using conventional mechanical means, such as hand mixing, ball mill mixing, vane mixing, paddle mixing, or any such method familiar to those of skill for mechanically mixing powders with oily liquids to result in substantially homogeneous distribution of the liquid on the surface of powder particles. Mixing is continued for a suitable period of time to provide homogeneous distribution of the ricinoleate ester(s) within the powder. No solvent or other means to facilitate the mixing is required; the ricinoleate ester is substantially distributed on the surface of the polymer powder particles sufficiently to observably and measurably reduce insoluble gel content in subsequently formed treated polymer solutions, when compared to untreated polymer solutions at the same polymer concentration.

In embodiments, mixing is followed by a period of hydration, which is about 1 minute to 60 minutes, or about 5 minutes to 60 minutes, or about 10 minutes to 60 minutes, or about 15 minutes to 60 minutes, or about 30 minutes to 60 minutes, or about 5 minutes to 30 minutes, or about 10 minutes to 30 minutes. The period of hydration includes allowing admixture to stand, or mixing the admixture, or a combination of both, for the indicated period of time and at a temperature of at least about 0° C. and generally less than about 100° C., often about 20° C. It is surprising and quite unexpected that a simple combination of mixing and standing admixing method is sufficient to provide a significant decrease in insoluble gel content of a polymer powder upon subsequent dissolution. The reduction in insoluble gel is both easily observed visually, and repeatable by direct comparison of treated polymer powders with untreated polymer powders.

Further regarding the above, it was unexpected that the period of hydration of the polymer powder is only 60 minutes or less. Conventional knowledge dictates that hydration of polyacrylamide homopolymers from dry powder takes several hours or more. For example, U.S. Pat. No. 9,682,347 discloses the same, or very similar gel test procedure to that employed herein. In that disclosure, the gel number is measured 3-4 hours after initiating hydration of the polymers.

In other embodiments, a treated polymer powder is formed by applying the alkyl ricinoleate to the polymer powder or to comminuted wet gel particles in a fluidized bed or Wurster coater (fluidized bed employing differential air stream). In such embodiments, the methodology employed to contact the powder particles with alkyl ricinoleate is specific to the particular equipment used and further selected by the user, as will be readily apparent to one of skill.

During the mixing or applying of the alkyl ricinoleate to the polymer powder, it is not necessary to add heat, such as raising the temperature of the polymer powder, the alkyl ricinoleate, or both prior to or during mixing thereof. However, in some cases a user may select to raise the temperature of one or more components during mixing or applying of the alkyl ricinoleate to the polymer powder. Before or during mixing, the temperature of the polymer powder, the C1-C6 alkyl ricinoleate, or both is about 10° C. to 100° C., or 20° C. to 100° C., or 10° C. to 90° C., or 10° C. to 80° C., or 10° C. to 70° C., or 10° C. to 60° C., or 10° C. to 50° C., or 10° C. to 40° C., or 10° C. to 30° C., or 10° C. to 20° C., as selected by the user and depending on the methodology employed to apply the alkyl ricinoleate to the polymer powder. In many embodiments, the temperature employed for mixing is ambient temperature, typically about 17° C. to 23° C. in an indoor environment.

In some embodiments a treated polymer powder comprises, consists essentially of, or consists of a polymer powder and about 0.1 wt % to 10 wt %, or about 1 wt % to 5 wt % C1-C6 alkyl ricinoleate based on the weight of the treated polymer powder, wherein the polymer powder comprises a particulate or granular polymer having an average particle size of about 0.5 µm to 5 µm when measured by light scattering, and 15 wt % water or less based on the weight of the polymer.

Surprisingly, the treated polymer powder is not different in outward, visual appearance or behavior from the polymer powder prior to applying alkyl ricinoleate, and consequently may be contained, transported, distributed, stored, and sold in a format such as any of those conventionally used to contain, transport, distribute, store, and sell the untreated polymer powder. Typically, the powders are contained, transported, distributed, stored, and sold in plastic or metal containers that are enclosed but include a removable portion such as a screw-on or snap-on lid such that the container is configured and adapted to dispense the powder. In some embodiments the container is designed and configured to be repeatedly opened and re-enclosed to enable aliquots of treated polymer powder to be removed from the container in batch mode. The treated polymer powders, like the untreated analogs thereof, are free flowing white powders that provide ease of handling, measurement, and mixing and are efficient to manufacture, transport, and store for the end user.

Use of the Polymer Powders

The treated polymer powders are useful for rapid and complete dissolution to form treated polymer solutions. Dissolution, typically done in the field and immediately before use, followed by use of the treated polymer solution for rheology modification in enhanced oil recovery, flocculation in wastewater treatment, mining or papermaking processes, or a similar industrial application: any known use for high molecular weight polyacrylamide (or a copolymer thereof) in solution will benefit from use of the treated polymer powders to form a treated polymer solution.

In some embodiments a treated polymer solution comprises, consists essentially of, or consists of about 0.01 wt % to 2 wt %, or about 0.05 wt % to 2 wt %, or about 0.1 wt % to 2 wt %, or about 0.2 wt % to 2 wt %, or about 0.3 wt % to 2 wt %, or about 0.4 wt % to 2 wt %, or about 0.5 wt % to 2 wt %, or about 0.6 wt % to 2 wt %, or about 0.7 wt % to 2 wt %, or about 0.8 wt % to 2 wt %, or about 0.9 wt % to 2 wt %, or about 1 wt % to 2 wt %, or about 1.1 wt % to 2 wt %, or about 1.2 wt % to 2 wt %, or about 1.3 wt % to 2 wt %, or about 1.4 wt % to 2 wt %, or about 1.5 wt % to 2 wt %, or about 1.6 wt % to 2 wt %, or about 1.7 wt % to 2 wt %, or about 1.8 wt % to 2 wt %, or about 1.9 wt % to 2 wt %, or about 0.1 wt % to 1.5 wt %, or about 0.1 wt % to 1.5 wt %, or about 0.1 wt % to 1.9 wt %, or about 0.1 wt % to 1.8 wt %, or about 0.1 wt % to 1.7 wt %, or about 0.1 wt % to 1.6 wt %, or about 0.1 wt % to 1.5 wt %, or about 0.1 wt % to 1.4 wt %, or about 0.1 wt % to 1.3 wt %, or about 0.1 wt % to 1.2 wt %, or about 0.1 wt % to 1.1 wt %, or about 0.1 wt % to 1 wt %, or about 0.1 wt % to 0.9 wt %, or about 0.1 wt % to 0.8 wt %, or about 0.1 wt % to 0.7 wt %, or about 0.1 wt % to 0.6 wt %, or about 0.1 wt % to 0.5 wt %, or about 0.1 wt % to 0.4 wt %, or about 0.1 wt % to 0.3 wt %, or about 0.1 wt % to 0.2 wt %, of a treated polymer powder in a water source.

The treated polymer solution comprises, consists essentially of, or consists of the treated polymer and the water source. Suitable water sources include fresh water, deionized water, distilled water, tap water, produced water, municipal water, waste water such as runoff water or municipal waste water, treated or partially treated waste water, well water, brackish water, "gray water", sea water, or a combination of two or more such water sources as determined by context. In some embodiments, the water source includes one or more salts, ions, buffers, acids, bases, surfactants, or other dissolved, dispersed, or emulsified compounds, materials, components, or combinations thereof.

A treated polymer powder dissolves rapidly and completely in a water source to form a treated polymer solution. "Complete" dissolution in this context indicates either about 90% of theoretical maximum Brookfield solution viscosity at the selected concentration, or observed solution viscosity has reached steady state and does not increase as a function of time, or both. In embodiments, a polymer powder is contacted with a water source to form a contacted mixture; and the contacted mixture is mixed using conventional methods and equipment for mixing dilute polymer solutions, such as hand mixing, hand stirring, shaking, swirling, tumbler mixing, roller mixing, static mixing, vane mixing, paddle mixing, sonication, high shear mixing, low shear mixing, or any such method familiar to those of skill for mechanically mixing polymers with solvents to form polymer solutions. Mixing is continued until substantially complete hydration is achieved, as evidenced by achieving a constant solution viscosity. Upon reaching peak viscosity, the contacted mixture is termed a "polymer solution." Constant solution viscosity is ex post facto evidence of having achieved a polymer solution.

In embodiments, a contacted mixture is allowed to stand, or is mixed, or a combination of standing and mixing is employed to facilitate hydration of the polymer chains by the water. The period of hydration is typically about 1 minute to 60 minutes, or about 5 minutes to 60 minutes, or about 10 minutes to 60 minutes, or about 15 minutes to 60 minutes, or about 30 minutes to 60 minutes, or about 5 minutes to 30 minutes, or about 10 minutes to 30 minutes. The contacted mixtures are converted to polymer solutions by allowing the contacted mixture to stand, or by mixing the contacted mixture, or a combination thereof for about 60 minutes or less after contact of the treated polymer powder with a water source, for example about 1 minute to 60 minutes, or 5 minutes to 60 minutes, or 10 minutes to 60 minutes, or 15 minutes to 60 minutes, or 30 minutes to 60 minutes, or 45 minutes to 60 minutes, or 1 minute to 45 minutes, or 1 minute to 30 minutes, or 1 minute to 15 minutes, or 5 minutes to 45 minutes, or 5 minutes to 30 minutes, or 5 minutes to 15 minutes, or 10 minutes to 45 minutes or 10 minutes to 30 minutes.

While any temperature between 0° C. and 100° C. is suitable for contacting, standing, and/or mixing, in embodiments temperatures ranging from 10° C. to 60° C. are often employed in the industry, with higher temperatures observed most often where the water sources is e.g. produced water or connate. Often, a temperature of about 20° C., for example 15° C. to 25° C., represents ambient temperature in a manufacturing facility and so is selected for convenience and efficiency during the contacting, standing, and/or mixing.

It is surprising and quite unexpected that simple admixing of a ricinoleate ester with a polymer powder, followed by dissolution of the powder in water, yields a solution having reduced insoluble gel content when compared to a polymer solution formed in the absence of the ricinoleate ester. The reduction in insoluble gel is easily observed visually, and is repeatable. It is also surprising and completely unexpected that mixing methods normally associated with formation of significant and observable foam, such as shaking or high speed paddle mixing and the like, do not result in significant foam formation during such mixing of the contacted mixture. Rather, mixing a contacted mixture to form a treated polymer solution is easily accomplished without foaming, which is a particular advantage when mixing is carried out in the field and foamed materials are problematic in a particular application, for example when using equipment such as a pump or a pressure differential to move a treated polymer solution within a tank or pipe. The non-foaming property of the treated polymer solutions also ensures full flexibility and ease of carrying out conventional methods of wastewater treatment, oil recovery, papermaking, and the like: one of skill recognizes that foaming is a problem that must be solved in many industrial processes. A treated polymer solution has observably reduced foaming compared to a corresponding untreated polymer solution, when subjected to mechanical mixing or other industrial processes that tend to cause polymer solutions to form a foam.

Upon complete dissolution of the treated polymer in the water source and concomitant formation of a treated polymer solution, there is less insoluble gel content than observed in the corresponding untreated polymer solution. An untreated polymer solution includes the same amount and type of water source and polymer powder, but the polymer powder is not treated (contacted or admixed) with a C1-C6 alkyl ricinoleate. In embodiments the treated polymer solutions have no observable insoluble gel content 1 minute to 60 minutes after mixing the treated polymer powder with the water source, or no observable gel content 5 minutes to 60 minutes, or 10 minutes to 60 minutes, or 15 minutes to 60 minutes; or 30 minutes to 60 minutes; or 45 minutes to 60 minutes, or 1 minute to 45 minutes, or 1 minute to 30 minutes, or 1 minute to 15 minutes, or 5 minutes to 45 minutes, or 10 minutes to 30 minutes after mixing the treated polymer powder with the water source.

In embodiments, a treated polymer solution includes 10 wt % to 99 wt % less insoluble gel than the corresponding untreated polymer solution, for example 10% to 90 wt % less, or 10 wt % to 80 wt % less, or 10 wt % to 70 wt % less, or 10 wt % to 60 wt % less, or 10 wt % to 50 wt % less, or 10 wt % to 40 wt % less, or 10 wt % to 30 wt % less, or 10 wt % to 20 wt % less, or 20 wt % to 99 wt % less, or 20 wt % to 90 wt % less, or 20 wt % to 80 wt % less, or 20 wt % to 70 wt % less, or 20 wt % to 60 wt % less, or 20 wt % to 50 wt % less, or 20 wt % to 40 wt % less, or 20 wt % to 30 wt % less, or 50 wt % to 99 wt % less, or 50 wt % to 90 wt % less, or 50 wt % to 80 wt % less, or 50 wt % to 70 wt % less, or 50 wt % to 60 wt % less, or 60 wt % to 99 wt % less, or 60 wt % to 90 wt % less, or 60 wt % to 80 wt % less, or 60 wt % to 70 wt % less, or 70 wt % to 99 wt % less, or 70 wt % to 90 wt % less, or 70 wt % to 80 wt % less, or 80 wt % to 99 wt % less, or 80 wt % to 90 wt % less, or 90 wt % to 99 wt % less insoluble gel than the corresponding untreated polymer solution.

The amount of insoluble gel in a polymer solution is determined by filtering a 0.25 wt % treated polymer solution through a 100 mesh screen and comparing the residue retained by the screen, with that retained after filtration of the corresponding untreated polymer solution. In the industry, this is often accomplished by reporting a "gel number" wherein the untreated polymer solution leads to a 60G rating (100% insoluble gel content) wherein 0G means no observable gel is retained after filtration.

It may be difficult in some cases to quantify the amount of insoluble gel remaining on a 100 mesh filter. This is in part due to the inherent difficulties in repeating such experiments and also the difficulty of weighing swollen, solvent saturated polymer particles. In recognition of these difficulties, qualitative assessment of gel content is based on comparison of insoluble gel content of an untreated polymer solution to insoluble gel content of the treated polymer solution after the same mixing/time factors are applied. Gel number is assessed by observation of gel visibly retained by the screen and applying a rating system wherein 60G represents substantially all the polymer observed to be retained by the screen as gel, with very little to no polymer present in the filtrate; and 0G represents no observable gel on the screen.

As described above, FIG. 1A is a photograph of the top of a 100 mesh screen showing the visual result consistent with a gel number of 0 (0G); FIG. 1B is a photograph of the top of a 100 mesh screen showing the visual result consistent with a gel number of 10 (10G); FIG. 1C is a photograph of the top of a 100 mesh screen showing the visual result consistent with a gel number of 30 (30G); and FIG. 1D is a photograph of the top of a 100 mesh screen showing the visual result consistent with a gel number of 60 (60G). We have repeatedly observed that gel number for the treated polymer solutions is 5G to 0G, or 4G to 0G, or 3G to 0G, or 2G to 0G, or 1G to 0G. In embodiments, a G value of a treated polymer solution is lower than the gel number of the corresponding untreated polymer solution by at least 1G rating factor, such as 1G, 2G, 3G, 4G, 5G, 6G, 7G, 8G, 9G, or even 10G lower than the gel number of the corresponding untreated polymer solution.

The treated polymer solutions are used in embodiments as injectates for enhanced oil recovery. Such treated injectates comprise about 100 ppm to 10,000 ppm (0.01 wt % to 1.00 wt %) polymer, or about 200 ppm to 5000 ppm, or about 200 ppm to 4000 ppm, or about 200 ppm to 3000 ppm, or about 200 ppm to 2500 ppm polymer. In embodiments, the water source used to form the treated injectate includes about 0.1 to 30 wt % total dissolved solids; in embodiments, the water source is sea water or connate or produced water.

Water sources having high total dissolved solids (TDS), for example about 1 wt % and as high as about 30 wt % are often encountered in use for EOR applications. This is because hydraulic fracturing and conventional oil recovery results in produced water having high TDS, temperatures in excess of 60° C., or both; rather than use fresh water, in such situations it is economical to reuse the produced water as the water source to form a polymer solution or treated polymer solution. It is an advantage of the treated polymer powders that dissolution in high TDS water, even such water at temperatures such as 60° C., is rapid and results in low insoluble gel content. However, fresh water or municipal water are also suitable water sources and result in rapid dissolution to form a treated polymer solution having low insoluble gel content.

Thus, a method of recovering hydrocarbon compounds from a subterranean reservoir includes forming a treated polymer solution and injecting the treated polymer solution into a subterranean reservoir; the viscosity of the treated polymer solution is suitable for creating a viscosity "wall" to push hydrocarbons up and out of the reservoir where they are suitably collected. Such enhanced oil recovery methods are suitably employed using the treated polymer solutions and without taking any special steps, using any non-conventional mixing or injection equipment. Superior results are obtained due to the efficiency of rapid mixing and little or no insoluble gel formation, along with no foaming during mixing.

The treated polymer powders and the treated polymer solutions formed from the treated polymer powders are also useful as flocculants and flow modifiers in water treatment, papermaking, and mining extraction and refining/converting processes. For example, many water soluble polymers used for EOR applications are also used as rheology modifiers for waterborne coatings or as flocculants in e.g. water treatment or papermaking applications. Accordingly, the treated polymer solutions are usefully employed in one or more papermaking applications using a Fourdrinier or inclined Fourdrinier apparatus, wherein water-based furnishes dispensed onto a wire can include a polymer to improve the rheological profile of the furnish as dictated by machine or application parameters. "Papermaking" as a term of art includes making paper—that is, cellulose based mats—as well as other nonwoven fibrous mats such as filtration media that employ e.g. thermoplastic, bicomponent, and/or glass fibers in addition to or instead of cellulose based fibers. One of skill will appreciate that the treated polymers and the resulting rapidly formed treated polymer solutions are advantageously employed in conjunction with industrial applications and processes such as wastewater treatment, mining extraction and refining processes, or energy extraction and refining processes.

EXPERIMENTAL

General Procedures
Procedure A. Synthetic Tap Water (STW)
Synthetic tap water was prepared by blending the components of Table 1.

TABLE 1

Components of synthetic tap water.

| Name | Mass (g) |
|---|---|
| $Na_2SO_4$ (anhydrous) | 1.4 |
| $CaCl_2 \cdot 2H_2O$ | 10 |
| $MgCl_2 \cdot 6H_2O$ | 6.3 |
| KCl | 0.6 |
| NaCl | 86.6 |
| DI water | 960.1 |

Procedure B. Brookfield Viscosity Measurement
A polymer powder is added to synthetic tap water at 0.25 wt % or at 1.0 wt % of the powder, as specified; and the mixture is stirred with a paddle mixer at 800 RPM during the addition to ensure dispersal of the particles; then stirring is continued for 1 to 3 hours total. Brookfield Viscosity is measured at 30 rpm, #62 spindle, 21° C. after the indicated time of mixing.
Procedure C. Gel Number
A polymer powder is added to synthetic tap water at 0.25 wt % powder; the mixture is stirred with a paddle mixer at 800 RPM during the addition to ensure dispersal of the particles; then stirring is continued for 1 to 3 hours total. Then 200 mL of the mixture is passed through a 100 mesh screen using only gravity to affect passage. Gel number is assessed by observing gel retained by the screen and applying a rating system wherein 60G represents substantially all the polymer observed to be retained by the screen as gel, with very little to no polymer present in the filtrate; and 0G represents no observable gel on the screen (all or nearly all polymer is present in the filtrate).
FIG. 1A is a photograph of the top of a 100 mesh screen showing the visual result consistent with a gel number of 0.
FIG. 1B is a photograph of the top of a 100 mesh screen showing the visual result consistent with a gel number of 10.
FIG. 1C is a photograph of the top of a 100 mesh screen showing the visual result consistent with a gel number of 30.
FIG. 1D is a photograph of the top of a 100 mesh screen showing the visual result consistent with a gel number of 60.

Example 1

A powder copolymer having 40 mol % acrylamide and 60 mol % 2-(acryloyloxy)-N,N,N-trimethylethanammonium chloride was admixed by hand for about 1 hour with 10 wt % methyl ricinoleate (neat), resulting in a treated polymer powder; the treated polymer powder was then mixed with synthetic tap water formed according to Procedure A (0.25 wt % of the mixture) to yield a treated polymer solution. The treated polymer solution was subjected to viscosity measurement according to Procedure B; results are shown in Table 2. The procedure was then repeated and the gel number assessed according to Procedure C; results are shown in Table 2.

Example 2

The procedure of Example 1 was repeated, except that 2 wt % methyl ricinoleate (neat) was used instead of 10 wt %. Results are shown in Table 2.

Example C1

The procedure of Example 1 was repeated, except that no methyl ricinoleate was mixed into the copolymer powder. Results are shown in Table 2.

TABLE 2

Brookfield viscosity, cP (30 rpm, 62 spindle) and gel number measurements as a function of time for Examples 1, 2, and C1.

| Time, | Example 1 | | Example 2 | | Example C1 | |
|---|---|---|---|---|---|---|
| min | Viscosity | Gel # | Viscosity | Gel # | Viscosity | Gel # |
| 15 | 278 | 5 | 292 | 0 | 272 | 10 |
| 30 | 317 | 1 | 309 | 0 | 322 | 10 |
| 45 | 355 | 1 | 310 | 0 | 334 | 7 |
| 60 | 332 | 1 | 318 | 0 | 320 | 5 |

It can be observed that methyl ricinoleate causes faster dissolution than the Control and with significantly less insoluble gel after 15 minutes mixing time. Example 2 was completely free of insoluble gel and further exhibited no foaming during mixing of the water with the treated polymer powder.

Example 3

A dry powder copolymer of 10 mol % 2-(acryloyloxy)-N,N,N-trimethylethanammonium chloride and 90 mol % acrylamide was admixed by hand for one hour with 10 wt % methyl ricinoleate (neat) to form a treated powder; the treated powder was mixed with synthetic tap water formed according to Procedure A (1.00 wt %) to yield a polymer solution. The water/polymer mixture was subjected to viscosity measurement according to Procedure B, except that mixing was at 800 rpm for 1 minute, then mixing was continued at 400 rpm for the remainder of the mixing time.

The Brookfield viscosity was measured to be 305 cP after the 60 minutes mixing time. No foaming was observed during the mixing.

Example 4

The procedure of Example 3 was repeated, except that 5 wt % methyl ricinoleate (neat) was used instead of 10 wt %. The Brookfield viscosity was measured to be 290 cP after the 60 minutes mixing time. No foaming was observed during the mixing.

Example C2

The procedure of Example 3 was repeated, except that no methyl ricinoleate was mixed into the copolymer powder. The Brookfield viscosity was measured to be 208 cP after the 60 minutes mixing time. Significant foaming was observed during the mixing.

Example 5

Figure 2:
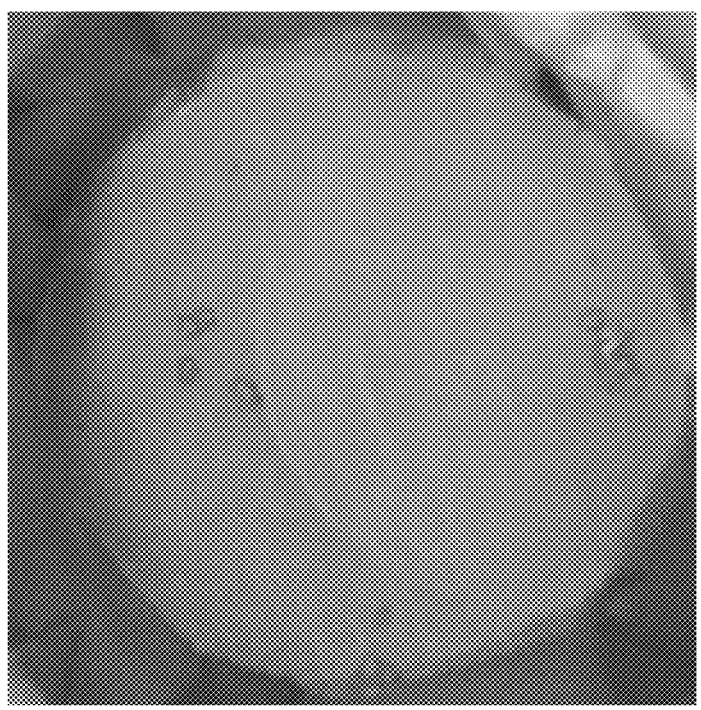
FIG. 2 is a photograph of the top of a 100 mesh screen showing the visual basis for assigning a gel number for a composition disclosed herein.

A dry powder copolymer of 30 mol % sodium acrylate and 70 mol % acrylamide was admixed by hand for one hour with 2 wt % methyl ricinoleate (neat) to form a treated powder; the treated powder was mixed with synthetic tap water formed according to Procedure A (1.00 wt %) at 800 rpm with a paddle mixer for five (5) minutes. The mixture was then immediately passed through a 100 mesh screen using only gravity. FIG. 2 is a photograph of the 100 mesh filter after the mixture of Example 5 was passed through. Only a small amount of gel is visible on the mesh surface; the result is consistent with a gel number of between 1 and 5

Example C3

Figure 3:
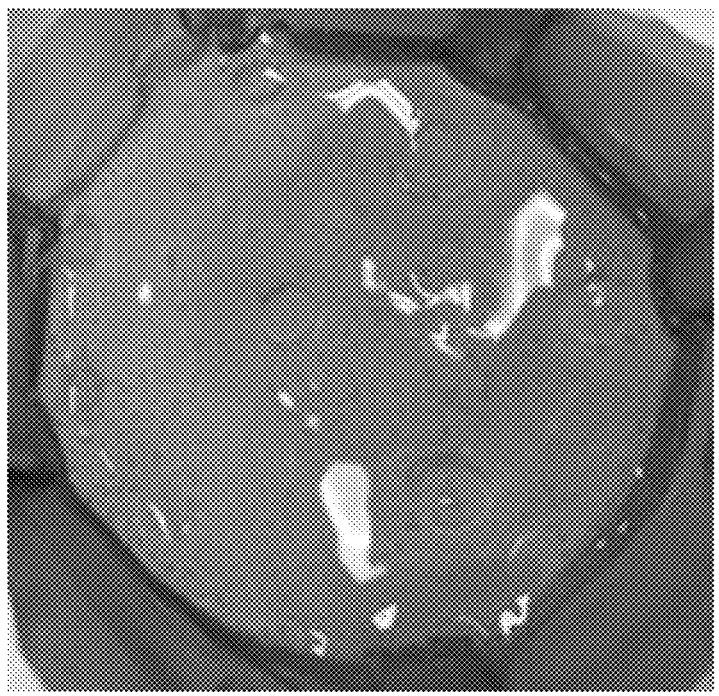
FIG. 3 is a photograph of the top of a 100 mesh screen showing the visual basis for assigning a gel number for another composition disclosed herein.

Example 5 was repeated except that no methyl ricinoleate was added to the polymer powder prior to dissolution in synthetic tap water. FIG. 3 is a photograph of the 100 mesh filter after the mixture of Example C3 was passed through. A large, thick pad of insoluble polymer gel is visible on the mesh surface. The result is consistent with a gel number of at least 30.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

The invention claimed is:

1. A treated polymer powder comprising
a water soluble polymer comprising about 30 mol % to 100 mol % acrylamide residues and having a weight average molecular weight of $1\times10^5$ g/mol to $1\times10^8$ g/mol; and
0.1 wt % to 10 wt % of a C1-C6 alkyl ricinoleate based on the weight of the treated polymer powder,
wherein the polymer is a particulate having a mean particle size of about 0.01 μm to about 10,000 μm as determined by light scattering, and comprises less than about 30 wt % water based on the weight of the powder.

2. The treated polymer powder of claim 1 wherein the water soluble polymer further comprises about 10 mole % to 70 mole % of a cationic monomer.

3. The treated polymer powder of claim 2 wherein the cationic monomer is selected from 2-(acryloyloxy)-N,N,N-trimethyl ethanammonium chloride (DMAEA.MCQ) 2-(acryloyloxy)-N,N,N-benzyl dimethyl ethanammonium chloride (DMAEA.BCQ) and 2-(methacryloyloxy)-N,N,N-trimethylethanammonium chloride (DMAEMA.MCQ).

4. The treated polymer powder of claim 1 wherein the C1-C6 alkyl ricinoleate is methyl ricinoleate.

5. The treated polymer powder of claim 1 wherein the treated polymer powder comprises about 1 wt % to 5 wt % of the C1-C6 alkyl ricinoleate.

6. The treated polymer powder of claim 1 wherein the polymer comprises 99.9 wt % to about 30 wt % acrylamide residues and further comprises one or more residues of acrylic acid or a conjugate base thereof; maleic acid or a conjugate base thereof; 2-acrylamido-2-methylpropane sulfonic acid or a conjugate base thereof; 2-methyl-2-[(1-oxo-2-propenyl)amino]-1-propanesulfonic acid or a conjugate base thereof; 2-(acryloyloxy)-N,N,N-trimethylethanammonium chloride; diallyl dimethylammonium chloride; or a mixture of two or more of these.

7. The treated polymer powder of claim 1 wherein the polymer is water dispersible.

8. A treated polymer solution comprising
about 0.01 wt % to 2 wt % of a water soluble polymer based on the weight of the solution;
about 0.1 wt % to 10 wt % of a C1-C6 alkyl ricinoleate based on the weight of the polymer; and
a water source,
wherein the water soluble polymer comprises about 30 mol % to 100 mol % acrylamide residues and has a weight average molecular weight of $1\times10^6$ g/mol to $2\times10^7$ g/mol.

9. The treated polymer solution of claim 8 wherein the water soluble polymer further comprises about 10 mole % to 70 mole % of a cationic monomer selected from 2-(acryloyloxy)-N,N,N-trimethyl ethanammonium chloride (DMAEA.MCQ), 2-(acryloyloxy)-N,N,N-benzyl dimethyl ethanammonium chloride (DMAEA.BCQ) and 2-(methacryloyloxy)-N,N,N-trimethylethanammonium chloride (DMAEMA.MCQ).

10. The treated polymer solution of claim 8 wherein the C1-C6 alkyl ricinoleate is methyl ricinoleate.

11. The treated polymer powder of claim 8 wherein the treated polymer comprises about 1 wt % to 5 wt % of the C1-C6 alkyl ricinoleate based on the weight of the polymer.

12. A method of forming a treated polymer solution, the method comprising:
mixing a polymer powder with 0.1 wt % to 10 wt % C1-C6 alkyl ricinoleate based on the weight of the powder to form a treated polymer powder, wherein the polymer comprises a polyacrylamide homopolymer or a copolymer thereof having at least 30 mol % acrylamide residue content and a weight average molecular weight in the range of $1\times10^6$ g/mol to $2\times10^7$ g/mol;
contacting the treated polymer powder with a water source to form a contacted mixutre; and
mixing the contacted mixture for about 1 minute to 60 minutes to form a treated polymer solution.

* * * * *

UNITED STATES PATENT AND TRADEMARK OFFICE
CERTIFICATE OF CORRECTION

| | |
|---|---|
| PATENT NO. | : 11,708,485 B2 |
| APPLICATION NO. | : 16/984867 |
| DATED | : July 25, 2023 |
| INVENTOR(S) | : Suresh R. Sriram and Ramasubramanyam Nagarajan |

Page 1 of 1

It is certified that error appears in the above-identified patent and that said Letters Patent is hereby corrected as shown below:

In the Claims

Column 18, Claim 3, Line 10, "(DMAEA.MCQ)" should be -- (DMAEA.MCQ), --.

Column 18, Claim 11, Line 50, "powder" should be -- solution --.

Column 18, Claim 12, Line 63, "mixutre;" should be -- mixture; --.

Signed and Sealed this
Nineteenth Day of December, 2023

Katherine Kelly Vidal
*Director of the United States Patent and Trademark Office*